(12) United States Patent
Lee et al.

(10) Patent No.: US 11,248,565 B2
(45) Date of Patent: Feb. 15, 2022

(54) PURGE CONTROL SOLENOID VALVE WITH NON-ADHESION COATING AT LOW TEMPERATURES AND METHOD FOR MANUFACTURING THE SAME

(71) Applicant: HYUNDAI KEFICO CORPORATION, Gunpo-si (KR)

(72) Inventors: Ahn Hee Lee, Gunpo-si (KR); Du Seok Lee, Gunpo-si (KR); Ji Hyun Lee, Gunpo-si (KR)

(73) Assignee: HYUNDAI KEFICO CORPORATION, Gyeonggi-do (KR)

( * ) Notice: Subject to any disclaimer, the term of this patent is extended or adjusted under 35 U.S.C. 154(b) by 127 days.

(21) Appl. No.: 16/532,951

(22) Filed: Aug. 6, 2019

(65) Prior Publication Data
US 2020/0049107 A1 Feb. 13, 2020

(30) Foreign Application Priority Data
Aug. 7, 2018 (KR) .......................... 10-2018-0091580

(51) Int. Cl.
*F02M 25/08* (2006.01)
*F16K 25/00* (2006.01)
(Continued)

(52) U.S. Cl.
CPC ......... *F02M 25/0836* (2013.01); *C08K 3/013* (2018.01); *C08K 3/04* (2013.01);
(Continued)

(58) Field of Classification Search
CPC ....... F02M 25/0836; F02M 2025/0845; F02M 2200/9038; F16K 25/005; F16K 31/0655;
(Continued)

(56) References Cited

U.S. PATENT DOCUMENTS 4,635,948 A * 1/1987 Zerfass .................. F16J 15/122
277/592
5,773,087 A * 6/1998 Kashihara .............. B05D 5/083
427/292

(Continued)

FOREIGN PATENT DOCUMENTS

KR 10-2007-0018523 A 2/2007
KR 10-2010-0002618 A 1/2010
(Continued)

*Primary Examiner* — Marina A Tietjen
(74) *Attorney, Agent, or Firm* — Mintz Levin Cohn Ferris Glovsky and Popeo, P.C.; Peter F. Corless

(57) ABSTRACT

A purge control solenoid valve includes a gas access body including an evaporation gas inlet, an evaporation gas outlet, and a path that connects the evaporation gas inlet and the evaporation gas outlet; a valve operation body including an armature coupled to the gas access body and performing a reciprocating motion in a direction in which the armature is brought into close contact with or separated from the path by a core that generates a magnetic force; and an armature top member being in close contact with or separated from the path due to the reciprocating motion of the armature to open or close the path. The armature top member has a non-adhesion coating formed on a top surface of a body thereof, and the non-adhesion coating includes a binder, graphite, polytetrafluoroethylene, and a crosslinking agent.

8 Claims, 5 Drawing Sheets

(51) Int. Cl.

| | | |
|---|---|---|
| *F16K 31/06* | (2006.01) | |
| *C09D 5/00* | (2006.01) | |
| *C09D 5/16* | (2006.01) | |
| *C08K 3/04* | (2006.01) | |
| *C08K 5/00* | (2006.01) | |
| *C08K 5/205* | (2006.01) | |
| *C08K 5/02* | (2006.01) | |
| *C08K 5/29* | (2006.01) | |
| *C08K 3/013* | (2018.01) | |

(52) U.S. Cl.
CPC .............. *C08K 5/0025* (2013.01); *C08K 5/02* (2013.01); *C08K 5/205* (2013.01); *C08K 5/29* (2013.01); *C09D 5/1687* (2013.01); *F16K 25/005* (2013.01); *F16K 31/0655* (2013.01); *F02M 2025/0845* (2013.01); *F02M 2200/9038* (2013.01)

(58) Field of Classification Search
CPC ....... F02D 41/004; C09D 5/1687; C09D 5/00; C09D 175/04; C09D 7/65; C09D 7/61; C08K 3/04; C08K 5/0025; C08K 5/205; C08K 5/02; C08K 5/29; C08K 3/013
See application file for complete search history.

(56) References Cited

U.S. PATENT DOCUMENTS

| | | | | |
|---|---|---|---|---|
| 2006/0058436 | A1* | 3/2006 | Kasler | .................... B60J 10/17 |
| | | | | 524/261 |
| 2007/0227299 | A1* | 10/2007 | Marchiando | .......... C04B 35/632 |
| | | | | 75/244 |
| 2007/0276068 | A1* | 11/2007 | Hintzer | ................ C09D 127/18 |
| | | | | 524/284 |
| 2011/0220348 | A1* | 9/2011 | Jin | ...................... E21B 17/1085 |
| | | | | 166/244.1 |

FOREIGN PATENT DOCUMENTS

| | | |
|---|---|---|
| KR | 10-2014-0106027 A | 9/2014 |
| KR | 10-2017-0122685 A | 11/2017 |

* cited by examiner

PURGE CONTROL SOLENOID VALVE WITH NON-ADHESION COATING AT LOW TEMPERATURES AND METHOD FOR MANUFACTURING THE SAME

CROSS-REFERENCE TO RELATED APPLICATION

This application claims the benefit of priority to Korean Patent Application No. 10-2018-0091580 filed on Aug. 7, 2018 in the Korean Intellectual Property Office, which application is herein incorporated by reference in its entirety.

BACKGROUND

1. Technical Field

The present disclosure relates to a purge control solenoid valve installed in an evaporation gas control system for a vehicle, and a method for manufacturing the same. More particularly, the present disclosure relates to a purge control solenoid valve having improved operational stability without adhesion at low temperatures by forming a coating on an armature top member that opens or closes the purge control solenoid valve through an up-and-down motion using a magnetic force, and a method for manufacturing the armature top member for use in the purge control solenoid valve.

2. Description of the Related Art

In general, a purge control solenoid valve is disposed between an intake manifold and a canister and controls fuel gases collected in the canister by inducing the fuel gases into a combustion chamber by opening or closing the purge control solenoid valve when a negative pressure is generated due to engine combustion, to prevent the evaporation gases of the fuel tank from being vaporized to the atmosphere. The purge control solenoid valve includes a chamber, an armature, a valve member, a core, and the like. The efficiency of the purge control solenoid valve may be controlled by an on-board computer or may be on/off controlled by the negative pressure of the intake manifold or an engine control unit (ECU).

In addition, as the armature performs reciprocating motions up and down by a magnetic force from the core, when the temperature of cooling water in the engine is low or when the engine idles, the valve is closed, and when the engine operates at a normal temperature, the valve is opened to transfer fuel evaporation gases collected in the canister to the intake manifold. For example, a purge control solenoid valve having a gas flow change point at an outlet port is proposed in Korean Patent Publication No. 10-2010-0002618. In addition, a purge control solenoid valve capable of reducing operating noises generated in an armature by installing a noise preventing member in a core is proposed in Korean Patent Publication No. 10-2007-0018523.

However, in order to meet recent regulations that are increasingly tightened for harmful emissions from a vehicle, performance requirements of the purge control solenoid valve need to be stricter accordingly. In other words, in terms of flow performance, it is necessary to maintain linearity of flow rates in low duty control regions while increasing the maximum flow rate even in high-temperature high-humidity environments.

In addition, in terms of air tightness performance, design and development requirements of the purge control solenoid valve tend to become stricter. In other words, air tightness should be maintained all times even at an event of abrasion due to repetitive operations. In particular, during a driving for an extended time in the low-temperature (e.g., freezing weather), a top surface of a body of an armature top member of the purge control solenoid valve may be adhered to a gas path entrance member, resulting in a vehicle breakdown.

SUMMARY

Accordingly, the present disclosure provides a purge control solenoid valve for preventing an icing phenomenon from occurring due to moisture absorbed into the purge control solenoid valve when a vehicle is exposed to high temperature and high humidity or low temperatures for an extended period of time. In an aspect, the present disclosure is directed to a purge control solenoid valve operating to maintain linearity of flow rates in low duty control periods by forming a coating for preventing an armature top member from being adhered to an evaporation gas path entrance.

In addition, the present disclosure provides a purge control solenoid valve, which includes an armature having a non-adhesion coating to absorb a contact shock due to a reciprocating motion of the armature even in harsh environments of exposure to high temperature and high humidity or low temperatures and to maintain air tightness performance for sealing a gas flow path, thereby improving both the air tightness performance in a closed state and non-adhesion performance in an open state, which are competing factors in designing the purge control solenoid valve, and a method for manufacturing the purge control solenoid valve.

To achieve the above objects of the present disclosure, according to an aspect of the present disclosure, a purge control solenoid valve is provided. The purge control solenoid may include a gas access body including an evaporation gas inlet, an evaporation gas outlet, and a path that connects the evaporation gas inlet and the evaporation gas outlet; and a valve operation body including an armature coupled to the gas access body. The armature may perform a reciprocating motion in a direction in which the armature is brought into close contact with or separated from the path by a core that generates a magnetic force, and an armature top member may be in close contact with or separated from the path due to the reciprocating motion of the armature to open or close the path. The armature top member may include a non-adhesion coating formed on a top surface of a body thereof, and the non-adhesion coating may include a binder, graphite, polytetrafluoroethylene and a crosslinking agent.

Specifically, the non-adhesion coating may be formed using a non-adhesion coating composition comprising, by weight, 25% to 80% binder, 1% to 15% graphite, 3% to 25% polytetrafluoroethylene, 3% to 25% crosslinking agent, and 3% to 25% solvent. More specifically, the non-adhesion coating may be formed using a non-adhesion coating composition comprising, by weight, 50% to 60% binder, 1% to 3% graphite, 15% to 20% polytetrafluoroethylene, 8% to 12% crosslinking agent, and 10% to 20% solvent.

According to another aspect of the present disclosure, there is provided a method for manufacturing an armature top member installed in a purge control solenoid valve. The method may include forming a non-adhesion coating by coating a non-adhesion coating composition on a surface of an armature top member body. The non-adhesion coating may be formed using a non-adhesion coating composition comprising, by weight, 25% to 80% binder, 1% to 15% graphite, 3% to 25% polytetrafluoroethylene, 3% to 25% crosslinking agent, and 3% to 25% solvent.

Specifically, the non-adhesion coating may be formed using a non-adhesion coating composition comprising, by weight, 50% to 60% binder, 1% to 3% b graphite, 15% to 20% polytetrafluoroethylene, 8% to 12% crosslinking agent, and 10% to 20% solvent. More specifically, the step of forming the non-adhesion coating may include coating the non-adhesion coating composition on the surface of the armature top member body and curing the coated non-adhesion coating composition at a temperature in the range from about 150° C. to about 180° C. for about 10 minutes to about one hour to form the non-adhesion coating.

According to still another aspect of the present disclosure, there is provided a method for manufacturing a purge control solenoid valve. The method may include forming a non-adhesion coating by coating a non-adhesion coating composition on an armature top member, obtaining an armature by coupling the armature top member to an armature body, and installing the armature between a valve operation body and a gas access body. The non-adhesion coating composition may include, by weight, 25% to 80% binder, 1% to 15% graphite, 3% to 25% polytetrafluoroethylene, 3% to 25% crosslinking agent, and 3% to 25% solvent.

Specifically, the non-adhesion coating may be formed using a non-adhesion coating composition comprising, by weight, 50% to 60% binder, 1% to 3% graphite, 15% to 20% polytetrafluoroethylene, 8% to 12% crosslinking agent, and 10% to 20% solvent.

As described above, the purge control solenoid valve according to the present disclosure may have both air tightness performance in a closed state and non-adhesion performance in an open state by forming a non-adhesion coating installed at an armature top member even in harsh environments of exposure to high temperature and high humidity or low temperatures. In addition, the non-adhesion coating may prevent leakage due to reduced roughness during a reciprocating motion of the armature. Therefore, the reliability in operating the armature and the durability of the purge control solenoid valve may be enhanced.

DETAILED DESCRIPTION

Figure 1:
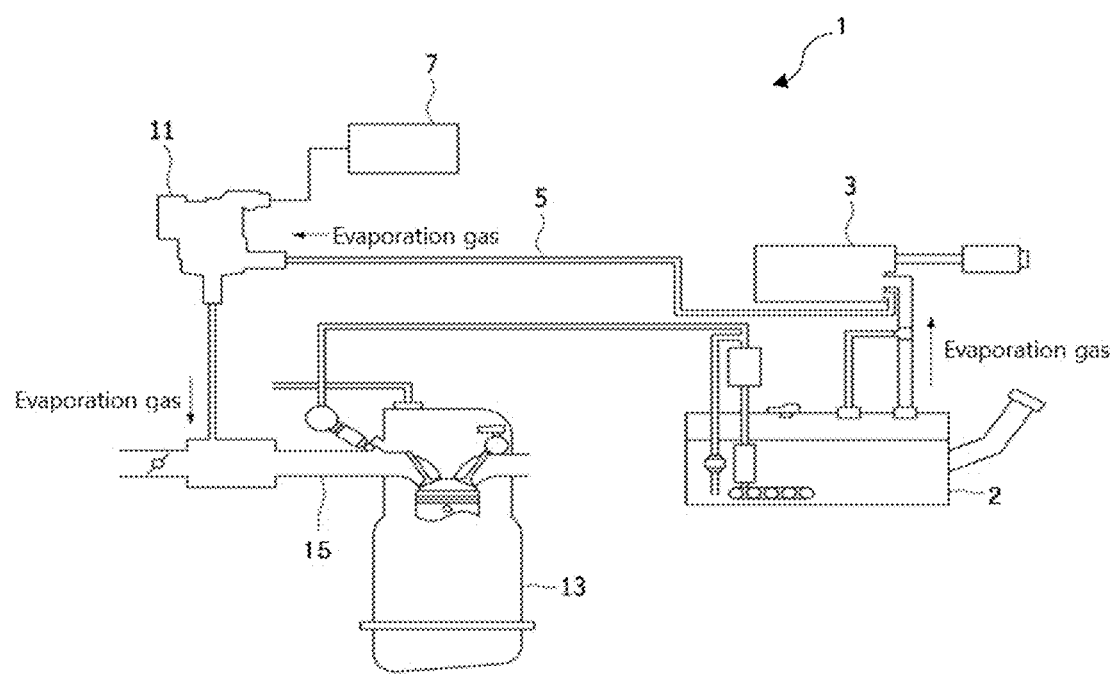
FIG. 1 is a schematic view illustrating the overall flow of a purge control solenoid system including a purge control solenoid valve according to an exemplary embodiment of the present disclosure.

Certain expressions used herein "formed on", "formed above", "formed below", "installed on", "installed above (over)" and "installed below (under)" are not intended to mean that corresponding components are in direct contact to be stacked (installed) but may mean that another component is further formed (installed) between the corresponding components.

In addition, the terms used in the following discussion are defined in consideration of functions in the present disclosure selected and may be varied based on operator's intention or customs in the art. Therefore, such terms should be defined based on the content provided throughout the specification of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure provides a purge control solenoid valve and a method for manufacturing the same. In addition, the present disclosure provides a method for manufacturing an armature top member used in the purge control solenoid valve.

Hereinafter, exemplary embodiments of the present disclosure will be described with reference to the accompanying drawings. The accompanying drawings illustrate example embodiments of the present disclosure and are provided for easy understanding of the disclosure. In the accompanying drawings, thicknesses of various layers or regions may be exaggerated to clearly show the layers or regions, and the scope of the present disclosure is not limited to thicknesses, sizes and/or proportions shown in the drawings.

FIG. 1 is a schematic view illustrating the overall flow of a purge control solenoid system 1 including a purge control solenoid valve 11 according to an exemplary embodiment of the present disclosure.

First, the purge control solenoid system (hereinafter, referred to as a control system) 1 may process about 20% of hydrocarbon (HC) discharged from a vehicle. The control system 1 may temporarily store evaporation gases generated from a fuel tank to prevent the evaporation gases from being released to the atmosphere and makes the evaporation gases introduced again into an engine to be burned when the engine has a normal air-to-fuel ratio. In particular, the fuel added after being purged may temporarily increase the air-to-fuel ratio but may then be adjusted by a feedback fuel controlling operation. However, an inappropriate purge control or a system failure, if any, may give rise to a probability of increasing the air-to-fuel ratio. The control system 1 may include a mechanical control mode using a thermowax, and a duty control mode, which is a more accurate control mode than the mechanical control mode, using an engine control module (ECM), also referred to as an engine control unit (ECU).

As shown in FIG. 1, the control system 1 based on the duty control mode using the ECU may include a fuel tank 2, a canister 3, an evaporation gas pipe 5, an ECU 7, a purge control solenoid valve 11, an engine 13, and an intake manifold 15. The control system 1 may be designed to be airtight. When the amount of gas-phase evaporation gas generated in the fuel tank 2 is increased, the evaporation gas may be transferred to the canister 3 through the evaporation gas pipe 5 and then stored in activated carbon present in the canister 3. The purged gas stored in the canister 3 may be fed into a combustion chamber in a normal operating condition of the engine that may afford in the air-to-fuel ratio and may then be combusted again.

The ECU 7 may be configured to analyze the purge control solenoid valve 11 in a closed state based on the amount of intake air and the temperature of cooling water. When the ECU 7 supplies the coil 270 with an electric current, the core 262 may be magnetized to pull an elastic body 250, and the armature B being in close contact with the elastic body 250 may descend together with the elastic body 250 to be in an open state. In particular, the evaporation gas collected in the canister 3 may move from an evaporation gas inlet 125 to an evaporation gas outlet 101 via a path entrance member 135 to be subsequently discharged to the engine 13 through the intake manifold 15.

The canister 3 may be also referred to as an evaporation gas storage container and may contain activated carbon, i.e., charcoal carbon, which is a black carbon that stores and emits fuel vapors.

In order to prevent the evaporation gas in the fuel tank 2 from being discharged to the atmosphere, a device for blocking or obstructing a path that extends from the fuel tank to the atmosphere and, when necessary, for transferring the evaporation gas to the intake manifold 15 for combustion may be required. The control system 1 may perform such functions.

The evaporation gas pipe 5 may be a pipe that connects the canister 3 and the valve 11. In other words, the evaporation gas pipe 5 may connect the canister 3 with the valve 11 to allow the evaporation gas stored in the canister 3 to move to the intake manifold 15 when the valve 11 is in an open state. The valve 11 may be opened or closed by the ECU 7 and may be installed on the evaporation gas pipe 5 that connects the canister 3 connected to the fuel tank 2 and the intake manifold 15 connected to the engine 13, as shown in FIG. 1, to allow the evaporation gas collected in the canister 3 to be burned in the engine 13.

Figure 2:
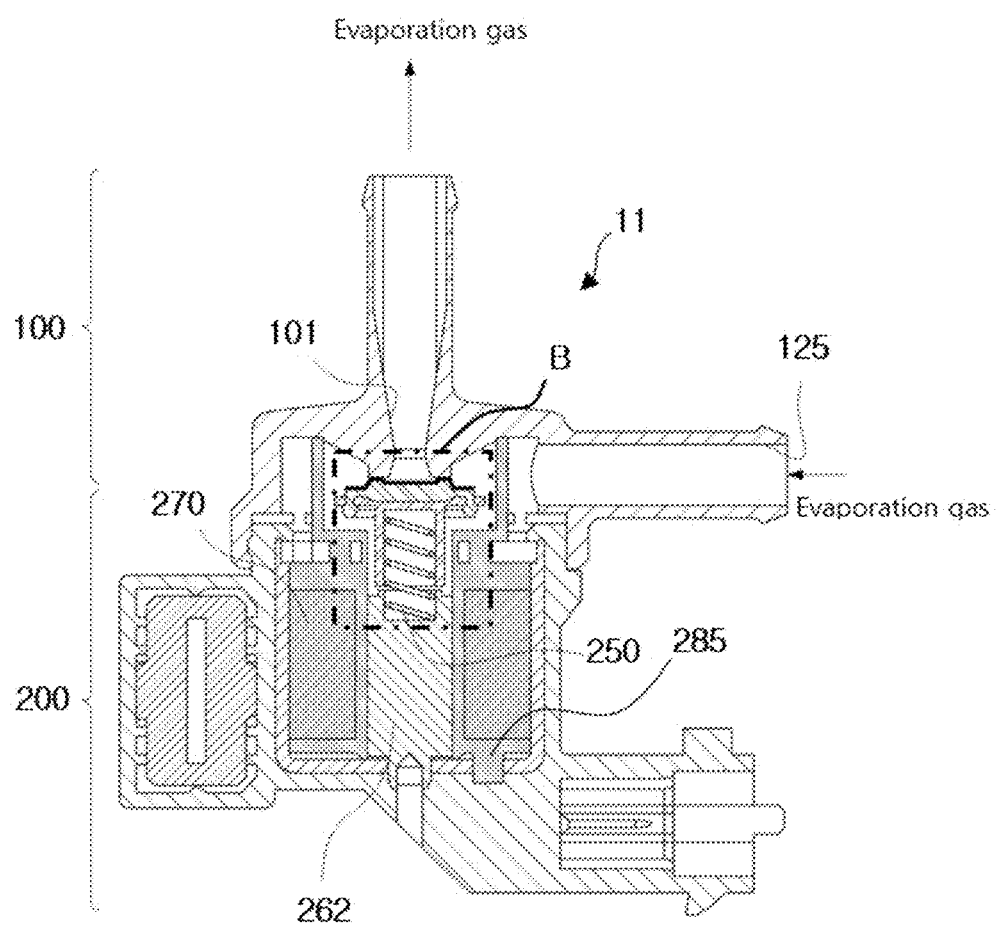
FIG. 2 is a cross-sectional view of the purge control solenoid valve according to an exemplary embodiment of the present disclosure.

FIG. 2 is a cross-sectional view of the purge control solenoid valve according to an exemplary embodiment of the present disclosure. The valve 11 may generally include a valve operation body 200 and a gas access body 100, which are assembled with each other or attached to each other to be installed. The valve operation body 200 may include a core 262, a coil 270, an elastic body 250, an armature B, an armature body 245, an armature top member 210, and a non-adhesion coating 220. In addition, the gas access body 100 may include an evaporation gas outlet 101, an evaporation gas inlet 125, and a path entrance member 135.

The valve 11, including the armature B that performs a reciprocating motion via the core 262 that generates a magnetic force by magnetizing the coil 270 to open or close the internal path, may discharge the introduced gas through the evaporation gas outlet 101 together with the valve operation body 200 connected to the ECU 7 by opening the internal path in an open state thereof.

Accordingly, when the ECU 7 supplies the valve 11 with a power to open the path of the evaporation gas pipe 5 based on the vehicle operation state, the coil 270 may be magnetized in the valve 11, to allow the armature B to pull and compress the elastic body 250 using the magnetic force generated in the core 262, and may thereby open the internal path. In other words, as the armature B being in contact with the gas access body 100 inside the gas access body 100 connected to the valve operation body 200 of the valve 11 is separated from the gas access body 100, the internal path of the gas access body 100 may be opened, and the evaporation gas introduced into the valve 11 through the evaporation gas inlet 125 may be discharged to the intake manifold 15 through the evaporation gas outlet 101. The valve operation body 200 may include a hollow part 285 formed therein, and the core 270 that generates a magnetic force may be provided in the hollow part 285.

Figure 3A:
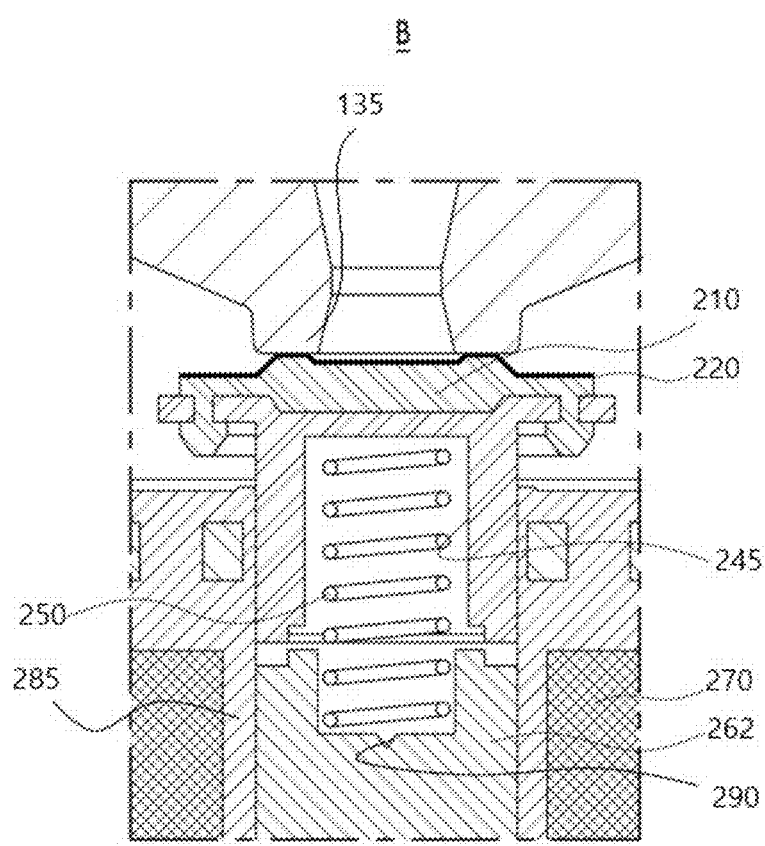
FIG. 3A is a cross-sectional view illustrating a closed state of an armature when the purge control solenoid valve according to an exemplary embodiment of the present disclosure operates.

FIG. 3A is a cross-sectional view illustrating a closed state of an armature when the purge control solenoid valve according to an exemplary embodiment of the present disclosure operates. More specifically, FIG. 3A illustrates an operating state of the armature B and shows a path entrance member 135 provided in the gas access body 100, and the armature top member 210, the non-adhesion coating 220, the armature body 245, the elastic body 250, the core 262, the coil 270, the hollow part 285, and a recess 290, provided in the valve operation body 200. In particular, the armature top member 210 and the path entrance member 135 may be in close contact with each other to be in a closed state.

In the armature B, the armature top member 210 may be coupled to the armature body 245. In addition, the recess 290 may be formed in an upper portion of the core 262, the elastic body 250 may be mounted in the recess 290, and the armature B may be disposed on the elastic body 250. The armature B may operate such that when the coil 270 installed in the hollow part 285 is supplied with an electric current by the ECU 7, the core 262 is magnetized to pull the elastic body 250, and accordingly, the armature B descends together with the elastic body 250.

Meanwhile, as the ECU 7 receives the load and RPM of the engine and an air conditioner switch signal, the control system 1 may control the purge control solenoid valve in a duty control mode based on the control conditions. When the duty is 0%, the valve may be closed to be in a closed state, and when the duty is 100%, the valve may be completely opened to be in an open state. Controlling of the valve may not be continuously performed. For example, the controlling of the valve may be performed for a predetermined period of time and then stopped from being performed for another predetermined period of time to allow the canister 3 to collect the fuel evaporation gas. A duty ratio of the valve 11 may be mainly determined by the RPM and the load of the engine.

The duty ratio is a term typically used with cyclic pulses. The duty ratio generally refers to an ON duty ratio, which refers to a percentage of time in which pulses are turned ON for one cycle. In other words, the motor may be accelerated while the pulses are ON, and the motor may maintain rotation by inertia with motor speeds decreasing while the pulses are OFF. Accordingly, as the ON periods are increased, i.e., as the duty ratio is increased, the acceleration periods are increased. Thus, the speed of the motor may be increased.

FIG. 3A illustrates a closed state of the armature B during operation of the purge control solenoid valve according to an exemplary embodiment of the present disclosure. In other words, FIG. 3A illustrates the valve that is in a closed state, when the duty is 0%. Since the armature top member 210 may be made of rubber, it may be adhered (e.g., may stick) to a path entrance member 135 in high-temperature and/or high-humidity environments when it is in close contact with the path entrance member 135 for an extended period of time. Therefore, even when the magnetic force is generated in the core 262 by supplying the coil 270 with an electric current, the armature B may not descend, to prevent the path from opening.

To avoid such adhesion, the non-adhesion coating 220 may be formed in the armature top member 210. The non-adhesion coating 220 may be formed using a non-adhesion coating composition including a binder, graphite, polytetrafluoroethylene (PTFE), a crosslinking agent, and a solvent. More specifically, the non-adhesion coating 220 may reduce a friction coefficient of the armature top member 210 made of rubber to prevent rubber-to-rubber adhesion and may enhance durability to reduce leakage when the armature top member 210 and the path entrance member 235 are in a closed state.

The non-adhesion coating composition used in forming the non-adhesion coating 220 may have superb properties including non-adhesiveness, heat resistance, and low friction, and may have a property of being soluble in a liquid containing PTFE. The non-adhesion coating composition may be coated by spraying and curing at about 150° C. for about 30 minutes, thereby forming the non-adhesion coating 220. The non-adhesion coating composition may include 25% to 80% polymer resin binder by weight, 3% to 25 PTFE as a filler by weight, 1% to 15% graphite by weight, 3% to 25% crosslinking agent by weight, and 3% to 25% solvent by weight. A balance of the non-adhesion coating composition may include other additives.

In addition, the binder may include a polyurethane dispersion (PUD). A polyurethane dispersion is advantageous in that high solid content and low density features are combined, irrespective of its molar weight, and may be added to increase the adhesiveness of the non-adhesion coating 220.

The PTFE may be further added to reduce the friction coefficient of the non-adhesion coating 220. The PTFE may form a stable compound by a strong chemical bond between fluorine and carbon to have characteristics of improved non-activating property, heat resistance, non-adhesiveness, and low friction coefficient. In addition, the PTFE may improve smoothness, releasability, and wear resistance of the non-adhesion coating 220.

The graphite generally has a material property that a strength increases with a temperature rise. The graphite functions similarly as the PTFE due to high thermal resistance and low thermal expansion and may be used as a filler of the non-adhesion coating 220 together with the PTFE.

The crosslinking agent may include carbodilite, which is a highly functional resin material. The carbodilite may enhance adhesion of a coating and may increase water resistance and heat resistance. The carbodilite may be optionally included by an amount of 2% to 8% by weight based on the weight of the non-adhesion coating composition.

The solvent may be any solvent that is capable of dispersing or dissolving the binder and/or the filler, and may be selected from water, an organic solvent or a mixture thereof. The additives may include, for example, a dispersant, a defoamer, a curing agent, a water repellent and/or a leveling agent, and specific examples thereof may be selected from respective materials commonly used in the art. The additives may be optionally contained in an amount of 1% to 2% by weight based on the weight of the non-adhesion coating composition.

Figure 3B:
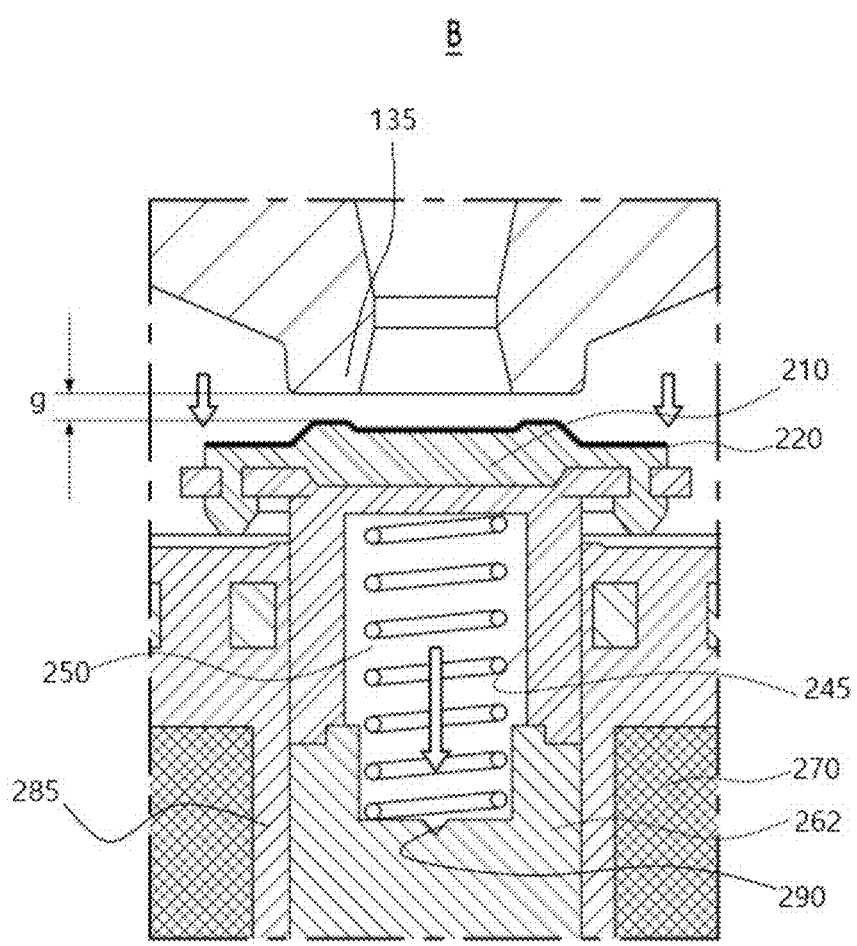
FIG. 3B is a cross-sectional view illustrating an open state of an armature when the purge control solenoid valve according to an exemplary embodiment of the present disclosure operates.

FIG. 3B is a cross-sectional view illustrating an open state of an armature when the purge control solenoid valve according to an exemplary embodiment of the present disclosure operates. The configuration and operating mode of the device shown in FIG. 3B are the same as those of the device shown in FIG. 3A. However, a gap g may be created in the opened state. The gap g may be a space created when the path entrance member 135 and the non-adhesion coating 220 are opened and may serve as a path that allows the evaporation gas to passes therethrough. In addition, when $Q_{low} \leq g \leq Q_{max}$, the operation of discharging the evaporation gas to the intake manifold 15 for circulation may be smoothly performed.

More specifically, the valve 11 may ensure a linear profile by connecting two points of $Q_{low}$ and $Q_{max}$, thereby allowing a system application engineer to perform smooth mapping and avoiding a problem of engine disharmony by performing a proper purge operation in a vehicle. Herein, $Q_{max}$ may refer to a maximum flow rate when the duty ratio is about 100%, i.e., when the valve is completely open. In addition, $Q_{low}$ may refer to a low duty flow rate when the differential pressure is about 700 mbar and the duty ratio is about 10%, which is one of frequently used ranges when a purge operation is typically performed in an idle state. In addition, the flow rate $Q_{low}$ may also be one of important indexes for ensuring the linearity of flow rates of the valve. When a constant flow rate is not ensured, a problem such as engine disharmony or engine stall may occur. Therefore, it is important to ensure the linearity based on specific conditions, i.e., the duty ratios.

In an example, the armature of the purge control solenoid valve including the non-adhesion coating was subjected to a short-term durability test under 30,000 km driving conditions in which the valve was operated 13,000,000 cycles at about 110° C. for about 5 days, followed by maintaining the valve in high-temperature and high-humidity environments (about 85° C. and 85% humidity) for about 4 hours and then maintaining the valve in a low-temperature environment (negative 20° C.) for about another 4 hours. The measured operating duty may be 10±2%. In this case, the constant flow rate may be ensured, thereby avoiding a vehicle breakdown.

Figure 4:
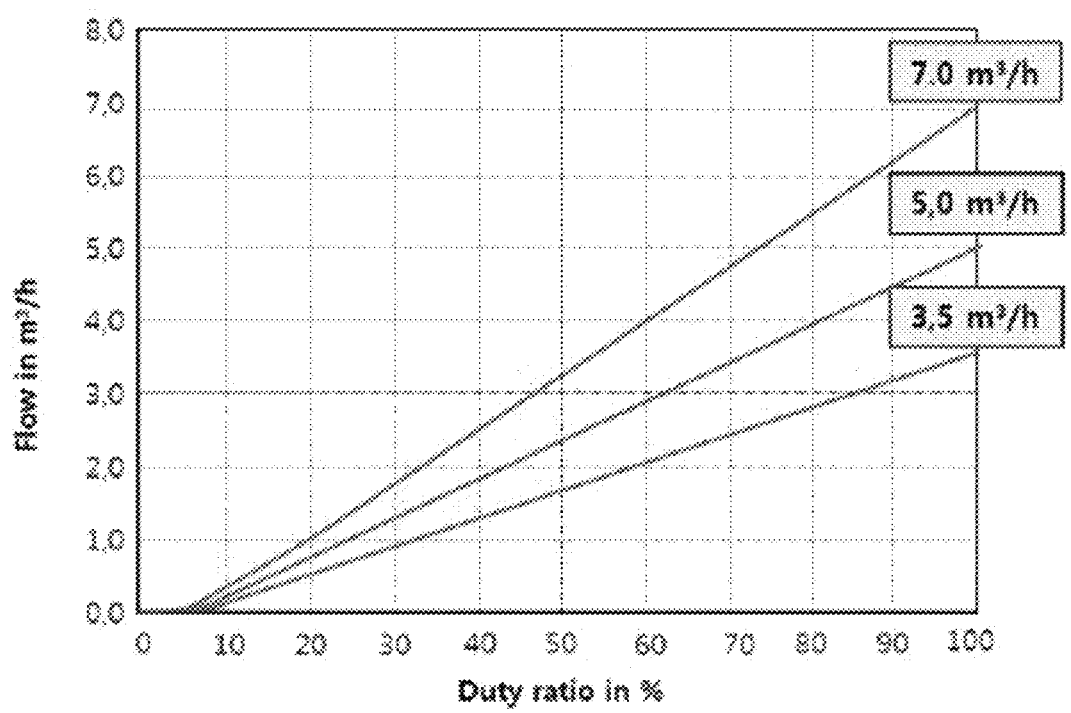
FIG. 4 is a graph illustrating a flow linearity depending on duty ratios.

FIG. 4 is a graph illustrating a flow linearity depending on duty ratios. The flow linearity may have features as represented by the graph shown in FIG. 4.

Hereinafter, Examples and Comparative Examples of the present disclosure will be described. The following examples are given solely for the purposes of illustration and are not to be construed as limitations of the present disclosure. In addition, the following comparative examples do not constitute the prior art but are given solely for the purposes of comparison with Examples of the present disclosure.

Example 1

A non-adhesion coating composition, including polyurethane dispersion (PUD) resin particles as a binder, carbodilite as a crosslinking agent, polytetrafluoroethylene (PTFE) particles, graphite particles, and a balance amount of a solvent and other additives, was prepared in a ratio of 55:10:8:2:25 percent (%) by weight, based on the weight of solid content.

Subsequently, the non-adhesion coating composition was coated on the armature top member 210 by a spray coating process and then dried at 150° C. for 30 minutes by a thermal curing process to form the non-adhesion coating 220. The non-adhesion coating 220 was then installed on the armature top member 210 to obtain a sample for the purge control solenoid valve 11 according to Example 1. The sample for the purge control solenoid valve 11 according to Example 1 had the non-adhesion coating 220 formed on a top surface of a body of the armature top member 210.

Example 2

A sample for the purge control solenoid valve 11 having the non-adhesion coating 220 was obtained in substantially the same manner as in Example 1 except that a coating solution was prepared by diluting the non-adhesion coating composition of Example 1 by further adding 50% of a solvent by weight.

Example 3

A sample for the purge control solenoid valve 11 was obtained in substantially the same manner as in Example 1 except that PTFE was used in an increased amount, compared to Example 1. Specifically, a non-adhesion coating composition, including binder particles, a crosslinking agent, PTFE particles, and graphite particles, and a balance of a solvent and other additives, was prepared in a ratio of 55:10:18:2 percent (%) by weight, based on the weight of solid content, and a balance including a solvent and other additives was used.

Example 4

A sample for the purge control solenoid valve 11 was obtained in substantially the same manner as in Example 3 except that a curing agent was further used as an additional component of the other additives to improve the adhesion performance, compared to Example 3, and the amounts of the binder and graphite were varied. Specifically, a non-adhesion coating composition, including binder particles, a crosslinking agent, PTFE particles, graphite particles, and a curing agent, was prepared in a ratio of 36:10:18:8:10 percent (%) by weight, based on the weight of solid content, and a balance including a solvent and other additives was used.

Example 5

A sample for the purge control solenoid valve 11 was obtained in substantially the same manner as in Example 4 except that a water repellent was further used as an additional component of the other additives to improve adhesion performance, compared to Example 4. Specifically, a non-adhesion coating composition, including binder particles, a crosslinking agent, PTFE particles, graphite particles, and a water repellent, was prepared in a ratio of 36:10:18:8:15 percent (%) by weight, based on the weight of solid content, and a balance including a solvent and other additives was used.

Comparative Example 1

A sample for the purge control solenoid valve 11 having the non-adhesion coating 220 was used in Comparative Example 1, the non-adhesion coating 220 obtained by coating a non-adhesion coating composition on a surface of a body of the armature top member 210 by dipping the composition in a molybdenum coating solution, spreading the composition using a brush, or applying the composition using a spray nozzle, followed by drying at room temperature and then curing. In particular, the molybdenum coating solution includes, by weight, 96% to 98% solvent, 1% to 3% perfluoro-based oil, 0.5% to 2.5% PTFE, and 0.5% to 2.5% perfluoro-based polymer.

Table 1 below shows ratios of percent (%) by weight of various coating compositions of various samples for the purge control solenoid valves 11 of Examples and Comparative Example 1 and evaluation results of coating adhesion occurring to the armature top member 210. In particular, the test for evaluating the occurrence of adhesion of the armature B to a path entrance member was performed by performing a short-term durability test under 30,000 km driving conditions where the valve was operated 13,000,000 cycles at about 110° C. for about 5 days, followed by maintaining the valve in high-temperature and high-humidity environments (85° C. and 85% humidity) for about 4 hours, and then maintaining the valve in a low-temperature environment (negative 20° C.) for about another 4 hours.

TABLE 1

<Weight percent ratios of non-adhesion coating compositions of various valve samples and adhesion occurrence>

| | Solvent | PTFE | Binder | Cross-linking agent | Graphite | Other additives | Curing agent | Water repellent | Adhesion |
|---|---|---|---|---|---|---|---|---|---|
| Ex. 1 | 24 | 8 | 55 | 10 | 2 | 1 | — | — | X |
| Ex. 2 (Ex. 1 + Dilution) | 24 | 8 | 55 | 10 | 2 | 1 | — | — | X |
| Ex. 3 | 14 | 18 | 55 | 10 | 2 | 1 | — | — | X |
| Ex. 4 | 17 | 18 | 36 | 10 | 8 | 1 | 10 | — | X |
| Ex. 5 | 12 | 18 | 36 | 10 | 8 | 1 | — | 15 | X |
| Comp. Ex. 1 | 96 | 1 | 1 | 2 | — | — | — | — | ○ |

As shown in Table 1, it was confirmed that the samples of Examples exhibited improved adhesion performance, e.g., excellent non-adhesion performance, even in a low-temperature environment compared to the sample of Comparative Example 1.

Table 2 below shows evaluation results of low duty flow performance and leakage performance of various samples of Examples 1 to 5, as evaluated by the test methods listed in Table 1.

TABLE 2

<Low duty flow performance and average leakage performance of various samples>

| | Duty 10% flow rate (Operating samples/Total samples) | | Worst Case: Minimum operating duty | | Average leakage performance (ml/min) | |
|---|---|---|---|---|---|---|
| | Before testing | After testing | Before testing | After testing | Before testing | After testing |
| Ex. 1 | 5/5 | 4/5 | 7% | 20% or greater | 5.45 | 0.34 |
| Ex. 2 | 4/4 | 3/4 | 7% | 12% | 5.87 | 0.36 |
| Ex. 3 | 5/5 | 5/5 | 7% | 10% | 2.87 | 0.25 |
| Ex. 4 | 4/4 | 3/4 | 7% | 12% | 5.62 | 0.24 |
| Ex. 5 | 5/5 | 3/5 | 7% | 20% or greater | 3.18 | 0.21 |

In Table 2, data listed in "Before testing" columns represent measurement results of initial performance of each of various samples, and data listed in "After testing" columns represent measurement results of final performance of each of various samples evaluated by continuously conducting a short-term durability test, a test conducted by leaving each valve sample in high-temperature and high-humidity environments, and a test conducted by maintaining each valve sample in a low-temperature environment.

First, in low duty flow performance tests, the duty 10% flow rate is based on a flow rate measured when the differential pressure is 700 mbar and the duty ratio is 10%, which is one of frequently used ranges when a purge operation is typically performed in an idle state. In addition, the flow rate is also one of important indexes for ensuring the linearity of flow rates of the valve. After testing, 3 samples among 5 samples operated at the duty 10% flow rate in Example 5. Further, one of the respective samples did not operate in Examples 1, 2 and 4. In Example 3, all of the samples among 5 samples in total operated, and the minimum operating duty was 10% in harsh environments, which confirms that the low duty flow performance of the sample of Example 3 was the highest. Therefore, it is confirmed that excellent low duty flow performance data of each of the samples are in the order of Example 3>Example 2≈Example 4>Example 1≈Example 5.

In addition, in terms of leakage performance, after testing, all of the samples demonstrated reduced leakage of 1 ml/min, compared to the leakage performance of each of the samples, measured before testing. As confirmed from the results, the leakage performance was improved due to reduced roughness after durability test, compared to the leakage performance measured before testing. Therefore, it is confirmed that the non-adhesion coating improves leakage performance and air tightness performance. Specifically, the best valve sample was obtained in Example 3, in which the average leakage flow rate was demonstrated to be the lowest even before testing.

According to the test results shown in Tables 1 and 2, in Example 1, PTFE was used in a reduced amount, compared to Example 3, one among 5 samples did not operate in the durability tests, and the minimum operating duty was 20% or greater, failing to satisfy the optimum operating duty, i.e., the duty of 10%. In other words, the evaluation results confirmed that the samples of Example 1 had low flow rate performance and durability.

In Example 2, the sample was prepared by diluting the sample prepared in Example 1 by 50% by further adding the solvent based on the solid content. The test results of Example 2 were the same as those of Example 1. In the leakage performance test, the leakage flow performance measured before testing was the highest, and the leakage flow performance measured after testing was also the highest, suggesting that the evaluated leakage flow performance was low.

In Example 4, graphite and the curing agent were further added and the binder was used in a reduced amount, compared to Example 3. The durability test results of Example 4 were similar to those of Example 2, and leakage performance and low duty flow performance were low.

In Example 5, the sample was prepared by adding a water repellent, instead of the curing agent used in Example 4. In Example 5, two among 5 samples did not operate in durability tests, and the minimum operating duty was 20% or greater, failing to satisfy the optimum operating duty, i.e., the duty of 10%. Therefore, the evaluation result confirmed that the samples of Example 5 had low durability.

Conversely, in Example 3, the sample was prepared from the non-adhesion coating composition including 50% to 60% binder, 1% to 3% graphite, 15% to 20% PTFE, 8% to 12% crosslinking agent, and 10% to 20% solvent by weight (specifically, the non-adhesion coating composition including binder particles, a crosslinking agent, PTFE particles, and graphite particles in a ratio of 55:10:18:2 percent (%) by weight, based on the weight of solid content). It was confirmed that the samples of Example 3 demonstrated best improvement results in terms of low duty flow performance and leakage performance.

While the present disclosure has been described with respect to the specific exemplary embodiments, it should be understood that the disclosure is not intended to be limited to the exemplary embodiments, and the spirit and scope of the disclosure is to be defined in the appended claims. Accordingly, it will be apparent to those skilled in the art that various changes and modifications may be made without departing from the spirit and scope of the present disclosure as defined in the following claims.

What is claimed is:

1. A purge control solenoid valve comprising:
    a gas access body including an evaporation gas inlet, an evaporation gas outlet, and a path that connects the evaporation gas inlet and the evaporation gas outlet;
    a valve operation body including an armature coupled to the gas access body, wherein the armature is configured to perform a reciprocating motion in a direction in which the armature is brought into close contact with or separated from the path by a core that generates a magnetic force; and
    an armature top member being in close contact with or separated from the path due to the reciprocating motion of the armature to open or close the path,
    wherein the armature top member includes a non-adhesion coating formed on a top surface of a body thereof, and the non-adhesion coating includes a binder, graphite, polytetrafluoroethylene, and a crosslinking agent, and wherein the non-adhesion coating is formed using a non-adhesion coating composition comprising, by weight, 25% to 80% binder, 1% to 15% graphite, 3% to 25% polytetrafluoroethylene, 3% to 25% crosslinking agent, and 3% to 25% solvent.

2. The purge control solenoid valve of claim 1, wherein the non-adhesion coating is formed using a non-adhesion coating composition comprising, by weight, 50% to 60% binder, 1% to 3% graphite, 15% to 20% polytetrafluoroethylene, 8% to 12% crosslinking agent, and 10% to 20% solvent.

3. A method for manufacturing an armature top member installed in a purge control solenoid valve, the method comprising:

forming a non-adhesion coating by coating a non-adhesion coating composition on a surface of an armature top member body, wherein the non-adhesion coating is formed using a non-adhesion coating composition comprising, by weight, 25% to 80% binder, 1% to 15% graphite, 3% to 25% polytetrafluoroethylene, 3% to 25% crosslinking agent, and 3% to 25% solvent.

4. The method of claim 3, wherein the non-adhesion coating is formed using a non-adhesion coating composition comprising, by weight, 50% to 60% binder, 1% to 3% graphite, 15% to 20% polytetrafluoroethylene, 8% to 12% crosslinking agent, and 10% to 20% solvent.

5. The method of claim 4, wherein the forming the non-adhesion coating comprises:

coating the non-adhesion coating composition on the surface of the armature top member body; and curing the coated non-adhesion coating composition at a temperature in a range from about 150° C. to about 180° C. for about 10 minutes to about one hour to form the non-adhesion coating.

6. The method of claim 3, wherein the forming the non-adhesion coating comprises:

coating the non-adhesion coating composition on the surface of the armature top member body; and curing the coated non-adhesion coating composition at a temperature in a range from about 150° C. to about 180° C. for about 10 minutes to about one hour to form the non-adhesion coating.

7. A method for manufacturing a purge control solenoid valve, the method comprising:

forming a non-adhesion coating by coating a non-adhesion coating composition on an armature top member;

obtaining an armature by coupling the armature top member to an armature body; and installing the armature between a valve operation body and a gas access body, wherein the non-adhesion coating composition comprises, by weight, 25% to 80% binder, 1% to 15% graphite, 3% to 25% polytetrafluoroethylene, 3% to 25% crosslinking agent, and 3% to 25% solvent.

8. The method of claim 7, wherein the non-adhesion coating is formed using a non-adhesion coating composition comprising, by weight, 50% to 60% binder, 1% to 3% graphite, 15% to 20% polytetrafluoroethylene, 8% to 12% crosslinking agent, and 10% to 20% solvent.

* * * * *